Figure 3:
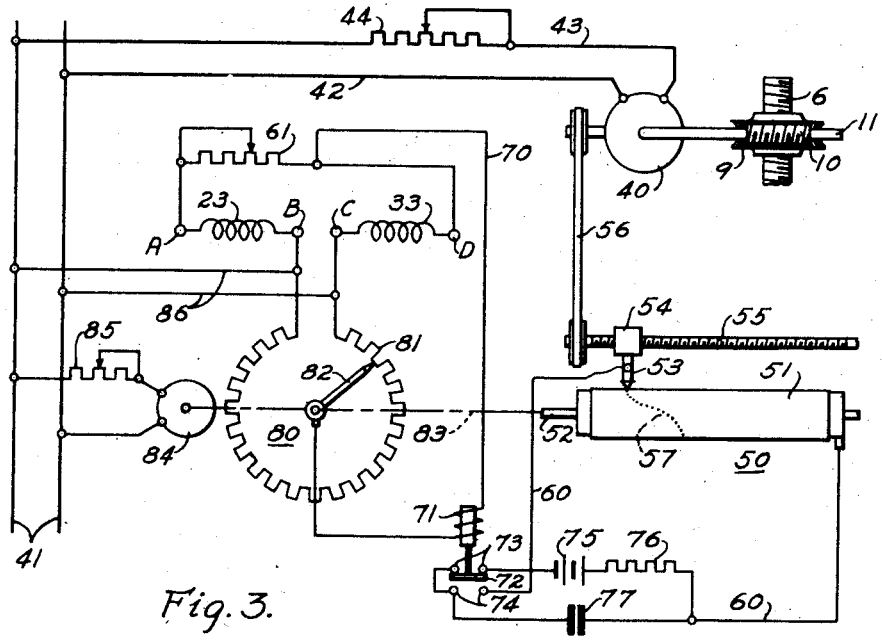

Aug. 29, 1944.  G. KEINATH  2,356,763
METHOD AND MEANS FOR TESTING MATERIALS
Filed April 10, 1943  2 Sheets-Sheet 1
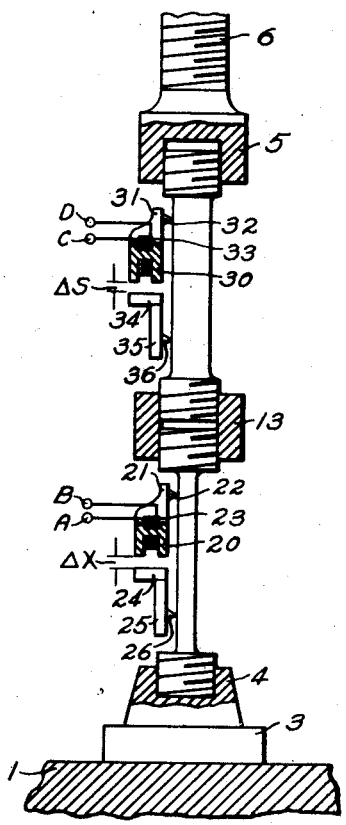
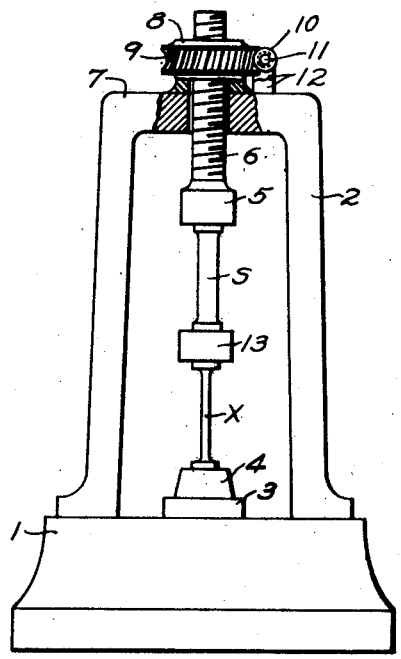
INVENTOR
George Keinath.
BY
AGENT Aug. 29, 1944.   G. KEINATH   2,356,763
METHOD AND MEANS FOR TESTING MATERIALS
Filed April 10, 1943   2 Sheets-Sheet 2

INVENTOR
George Keinath.
BY Curt M. Avery
AGENT

Patented Aug. 29, 1944

2,356,763

UNITED STATES PATENT OFFICE 2,356,763

METHOD AND MEANS FOR TESTING MATERIALS

George Keinath, Larchmont, N. Y.

Application April 10, 1943, Serial No. 482,585

10 Claims. (Cl. 265—12)

My invention relates to methods and means for testing materials and is related to the testing methods and means described in my copending application, Serial No. 219,919, filed July 18, 1938, now Patent No. 2,316,253.

The available methods of testing materials can be ranged into two types. One type requires a destruction or damaging of the specimen for determining the qualities of the material to be tested. The other serves for testing machine parts and like bodies without damage to the test object. The former type of test methods is usually employed for testing unfabricated materials for mechanical strength values, while the latter type method lends itself more readily for supervising the output of a running production.

It is an object of the invention to provide a testing method and testing means which are basically applicable for both types of tests just mentioned and which, when applied to production tests of the second type, afford a higher accuracy than the corresponding test methods heretofore available for production test purposes.

In the known methods and devices for determining the stress-strain characteristics of materials, the indication or record produced shows the full strain in a specimen, or in a part thereof, in dependence upon the stress applied to the specimen. The accuracy of these characteristics, as I have recognized in accordance with my invention, is rather limited; and it is therefore another object of my invention to provide testing methods and means for producing stress-strain diagrams of greater accuracy than heretofore obtainable.

A further object of my invention is to achieve the above-stated results by relatively simple means and with the aid of electrical measuring equipment in order to utilize the simplicity and reliability of this type devices.

Still another object of the invention is the provision of a testing method and corresponding testing means that lend themselves readily for all customary tests, such as tension, compression, elongation, torsion, vibration or fatigue tests.

An object is also to afford a comparative testing procedure, that is, a comparison of a specimen with a standard piece, which does not rely for accuracy of measurement on fixed dimensions of the standard relative to the specimen, but can be performed with equal advantage if the dimensions of the standard depart within wide limits from those of the specimen, thus permitting to use a standard for different size specimens to be tested.

According to the invention, in one of its basic aspects, the specimen to be tested is firmly connected with a standard piece and both are simultaneously subjected to varying stress while the strain or deformation caused by the stress in the two stressed bodies is translated by electric detector devices into two corresponding electric magnitudes such as impedance or voltage magnitudes. These two magnitudes are, in turn, caused to act on an electric measuring network so as to produce therein a differential electric effect indicative of the behavior of the specimen under stress relative to the equally and simultaneously stressed standard piece. The differential value is indicated or recorded in correlation to the appertaining stress and taken as a measure of the mechanical qualities to be determined. The specimen and the standard piece, when stressed, are in series connection to each other and the appertaining electric translating or detecting devices lie in opposite branches of the measuring network so as to oppose each other with respect to their resultant effect on the differential or zero branch of the network.

The standard piece is designed in consideration of the intended maximum stress so that its strain remains within the elastic limit during the entire testing procedure. Hence, under linearly progressing stress magnitudes, the deformation of the standard piece remains also linear. This is obtained either by selecting an especially good material for the standard piece, or designing it with sufficiently large dimensions, or by applying both of these possibilities.

If the specimen is sound and the stress kept below the yield limit of the specimen, its strain will also vary in accordance with a linear function. Hence, there will be no or negligibly little non-proportional deformation so that the measuring network shows no disturbance of its previous balance. In other words, the indicator upon proper initial adjustment of the network shows no differential effect. This lack of indication reveals the soundness of the specimen so that the observer may pass it for its intended use. On the other hand, any flaw, crack or other fault of the specimen will result in a nonproportional deformation at stress values where a sound specimen does not show such an effect. Hence now, a differential value will be indicated and reveal the specimen as faulty.

It should be noted that the standard piece, as long as the foregoing condition remains fulfilled, may be longer or shorter, thicker or thinner than the specimen. While these dimensions are relevant as regards the sensitivity of measurement, they may be varied within wide limits without affecting the above-mentioned basic operation. However, according to another feature of my invention, the standard piece is made of the same material as the specimen or of a material similar thereto and is given the same length but a different, preferably larger cross section. This has the advantage that changes in ambient temperature, acting like tensile or compressive stress on the material as to elongation, affect the elongation of both bodies equally and are thus compensated as to their influence on the zero-point calibration of the measuring network and indicating or recording instrument.

Figure 4:
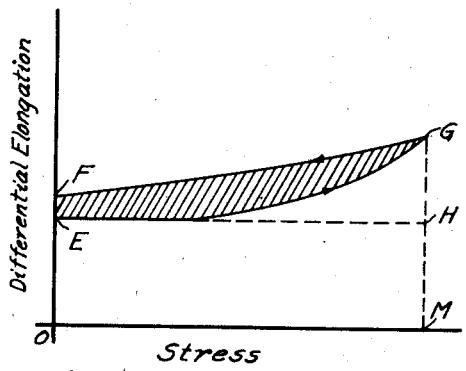
Figure 5:
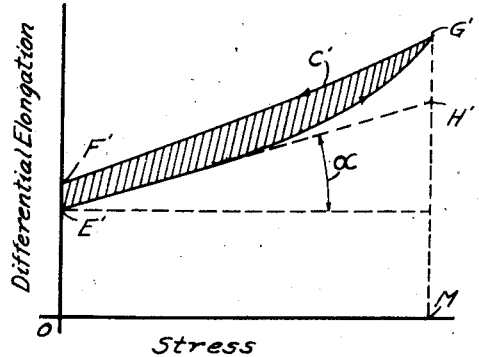
Figure 6:
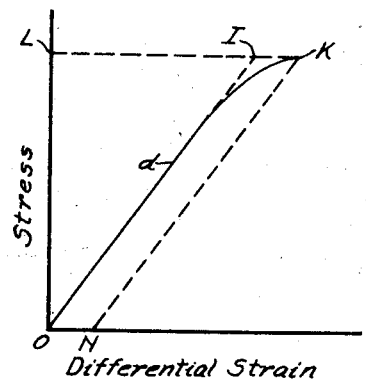

The invention will be more fully understood from a description of the embodiment shown in the drawings, in which Figure 1 shows the specimen and standard piece assembly of a testing machine according to the invention, Fig. 2 shows the substantially complete mechanical portion of the testing machine proper, Fig. 3 shows a diagram of the electric circuit means for operating the machine and performing strain-stress measurements, while Figs. 4, 5 and 6 are explanatory and illustrate three different strain-stress diagrams of the type obtainable with a testing equipment according to Figs. 1 to 3.

Referring at first to Figs. 1 and 2, numeral 1 denotes the base structure of a machine for testing a rod-shaped specimen as to its mechanical quality by subjecting it to tensile strength. A sturdy frame 2 is mounted on the base 1. An anchoring member is also mounted on the base and carries a threaded terminal piece 4. A similar terminal piece or holder 5 is attached to a threaded shaft 6 which passes through an opening in the head portion 7 of the frame 2 and is engaged by a heavy nut 8. The nut is provided with a worm wheel 9 which rests rotatably against a bearing surface of the head 7, and meshes with a worm 10 whose shaft 11 is journalled in projections 12 of the head portion 7. Rotation of the worm shaft 11 causes the worm gear to rotate the nut 8 and to raise or lower the shaft 6 with the holder 5 in order to exert stress on the testing assembly proper as will be more clearly apparent from the following.

The specimen X to be tested has elongated shape. Its ends are threaded, one end being screwed into the anchoring holder 4. The other end is screwed into an internally threaded connector 13. A standard piece S also of elongated shape and provided with threaded ends is also engaged by the connector 13 and screwed into the holder 5. As a result, the two bodies X and S are firmly connected with each other in a rigid series arrangement. Consequently, when rotating the worm shaft 11, as explained previously, the assembly of X and S is stressed; for instance, by tension. The stress acts simultaneously and to the same extent on both axially series-connected bodies.

According to one of the aforementioned aspects of the invention, the bodies X and S consist of similar material and have equal length, while the cross section of the standard piece S is larger, for instance, twice as large than that of the specimen X. Since the temperature-responsive elongation of most structural metals is substantially the same, some other material may also be chosen for the standard piece, in particular a material with a high yield point in order to insure a proportional deformation of the standard piece over the entire range of stress to be applied for the test.

As shown in Fig. 1, a strain-responsive electric device is attached to each of the bodies X and S. Each of these devices, in the illustrated embodiment, contains a magnetic core body 20 and 30, respectively, mounted on a holder 21 or 31 which is attached to the specimen or standard and has a gauge point 22 or 32 resting firmly against the body X or S, as to be prevented from motion relative to the point engaged by the gauge point. An inductance coil 23 or 33 is mounted on the core 20 and 30, respectively. The terminals of coil 20 are denoted by A and B, and the terminals of coil 30 by D and C. A magnetic armature 24 mounted on a holder 25 is attached to the specimen X, a gauge point 26 securing a fixed reference point between the armature and the specimen. The armature 24 lies opposite the poles of the core 20, with an air gap DX between them. When the specimen X varies its length between the wedge points at 22 and 26, due to the testing stress, the air gap DX varies an equal amount. As a result the inductive impedance of coil 23 is varied accordingly.

A similar armature assembly, formed of parts 34, 35 and 36 is provided at the standard piece S and involves an air gap DS which varies in accordance with length variations of the standard thereby causing the coil 33 to vary its impedance correspondingly.

In Fig. 3, the parts 8, 9, 10, 11 of the machine proper will be recognized in their correlation to coils 23 and 33 and their respective terminals A, B and C, D as required for the testing and measuring operation. The worm shaft 11 is actuated by a drive, here represented diagrammatically by an electric motor 40 energized from a current source 41, for instance an alternating current line, over leads 42 and 43 which include a control rheostat 44.

A recording device 50 is provided for indicating and recording the stress-strain characteristic to be determined of the specimen. The recorder has a recording drum 51 mounted on a shaft 52. A recording stylus 53 is carried by a holder 54 which is mounted on a threaded shaft 55 so as to displace the stylus 53 along the drum 51 when the shaft 55 is revolved accordingly. The drum 51 serves to transport or accommodate a recording chart or tape and the stylus to produce recording marks on the chart. However, the two movable recorder elements 51 and 53 are idle, i. e. they do not effect a record merely by performing their relative motion. In order to cause a recording mark to be produced, a separate energization by an electric pilot circuit 60 is provided. There are various ways of operating a recorder in this manner. For instance, an ink stylus may be employed whose ink supply is controlled by the energizing pilot circuit so as to flow only at the instant a control impulse is applied. Another way is to employ current-responsive recording paper of electrolytic type and to design the drum 51 and stylus 53 as electrodes for passing energizing current through the paper at the proper moment. To this end, as shown in Fig. 3, the drum 51 and stylus 53 are series connected in the pilot circuit 60. A similar marking effect can also be obtained by passing from the electrodes a puncturing discharge through suitable recording paper.

The threaded stylus shaft 55 is connected by a coupling, represented by a belt drive 56, with the drive 40 of the worm shaft 11. As a result, the stylus 53 is moved in accordance with the motion of the machine shaft 6. Consequently, the position and displacement of the stylus along the recorder drum 51 is proportional to the displacement of the holder 5 (Figs. 1 and 2) and thus indicative of the stress applied to the specimen-standard assembly.

The coils 23 and 33 of the variable inductance devices are connected with each other in a balanceable bridge-type network whose diagonal or zero branch 70 includes the coil 71 of a relay. The relay has a movable contact member 72 arranged to cooperate with two pairs of stationary contacts 73 and 74. As long as an unbalance current flows through the zero branch 70, the member 72 is attracted by the relay coil 71. In the moment of balance in the zero branch the movable member 72 drops temporarily and engages contact 74.

A rheostat 80 forms part of the measuring network and has a resistor 81 connected between the coils 23 and 33 and tapped by a slide contact 82 which forms one terminal of the zero branch 70. The resistor 81 is of circular shape and the contact 82 is rotatable. A shaft, denoted by a dot-and-dash line 83, is connected with the slide contact 82 and also with the shaft 52 of the recorder drum 51. Shaft 83 is driven by a motor 84 fed from the current source 41 over a regulating rheostat 85 to adjust its speed. The current source is also connected, through leads 86, with the measuring network to energize the latter.

The relay member 72 and the stationary relay contacts 73 and 74 are connected with the pilot circuit 60 and with an associated discharge circuit including a current source 75, a resistor 76, and a capacitor 77 or the like energy storing device. When contacts 73 are engaged by member 72, as is shown in Fig. 3, the source 75 is connected over resistor 76 with capacitor 77 and charges the latter. As soon as member 72 switches over to contacts 74, the source 75 is disconnected while the charged capacitor 77 is placed into the pilot circuit proper and discharges itself instantaneously through the recorder elements 51 and 53 and the chart between these elements thereby producing a recording mark on the chart.

The rheostat 80 has a resistance range large enough to include the balance condition of the bridge network. That is, the movable tap contact 82 passes through a point somewhere along its cyclical travel where the effect of the two coils 23 and 33 on the diagonal 70 and the relay coil 71 are in balance so that the relay is deenergized for a moment and causes its movable member 72 to discharge the capacitor 77 over contacts 74 and pilot circuit 60 through the recorder 50. As a result, a recording mark is produced on the chart on drum 51. Since the impedance values of coils 23 and 33 vary in accordance with the strain or deformation of the specimen X and the standard piece S, the phase position of contact 82 relative to resistor 81 at the instant of balance is indicative of the strain or deformation of X and S relative to each other. Due to the synchronous drive of contact 82 and recorder drum 51, the rotary position of the drum at the instant of balance is also indicative of the differential strain value. Hence, the location of the recording mark produced in the same moment on the chart is representative of the differential strain or deformation then obtaining. Since further the stylus in that moment assumes a position along its linear travel which corresponds to the stress then applied to the X—S assembly, as explained in an earlier place, the recording mark indicates by its coordinates one point of the stress-stream characteristic to be determined. As the contact 82 and drum 51 complete another cycle while the position of the stylus 53 changes in accordance with the changing stress, another point is marked on the chart, and so forth until a complete stress-strain curve, such as 57 in Fig. 3, is obtained. The speed of the drive motor 84 can be adjusted within wide limits and there are no particular requirements as to constancy of speed. As a matter of fact, the speed may vary or the cycles may follow one another in irregular intervals, if desired. Likewise, the stress producing motor 40 may be operated at any convenient speed. As a rule, however, it will be preferable to run motors 40 and 84 continuously at substantially constant speed while a test is progressing.

It is essential that the measuring method performed by the above-described apparatus does not measure the strain values directly but indicates the strain as a differential effect. Therefore, small changes in strain are measured with considerably greater accuracy than obtainable when measuring full strain values. Also the fact that the differential value is formed electrically in a balanceable measuring network rather than in mechanical devices contributes essentially to the accuracy and reliability of this method. That a measuring apparatus according to this invention can easily be rendered insensitive to changes in ambient temperature has been explained in an earlier place.

The sensitivity of the measuring method can be adjusted within wide limits by a corresponding choice of the standard piece S relative to the specimen X. The standard may approximate the specimen as to strength and dimensions, or it may be smaller or larger depending upon the requirements of the intended test. In other words, and referring to tensile stress tests, the elongation of the standard under equal stress may be about equal to that of the specimen or preferably smaller. A larger elongation of the standard is as a rule less desirable. A favorable choice for most cases is to give the standard and the specimen substantially equal length and to keep the cross section of the standard larger in order to prevent it from being stressed beyond the yield limit.

When beginning a testing operation and after having assembled the specimen and standard and their respective electric strain measuring devices, the load is at first varied from zero to a value far below the stress maximum to be applied, for instance, a few per cent thereof. The deformation of the specimen at this low initial stress value is safely within the zone of proportionality. Therefore, the indicator or recorder is supposed to indicate zero. If this is not the case, due to some play in the mechanism, a zero adjustment should be made. To this end a calibrating member such as resistor 61 (Fig. 3) is provided in the measuring network. After zero calibration, the test proper is performed by increasing the load gradually to a maximum value. For running production tests, this maximum value is kept below the yield point of a sound specimen. Consequently, the indication remains at zero when the specimen is sound. Since no damage is done to the specimen, it remains in usable condition.

A faulty specimen, however, will show permanent deformation and hence cause the instrument to indicate a differential value. Depending upon the magnitude of this value, the specimen will have to be rejected.

When using the machine for testing a specimen by a damage test, the stress is increased beyond the yield limit of the specimen without exceeding the yield point of the standard piece. Then the instruments indicate the permanent deformation of the specimen or rather the differential value of permanent and proportional deformation and thus afford it high accuracy also for this type of test.

The machine also permits recording strain-stress hysteresis loops. For this purpose, the load is first gradually increased to a maximum value within the range of permanent deformation of the specimen and then reduced back to the initial value. The curves thus obtained on the record chart are of the type exemplified by Figs. 4 and 5.

According to Fig. 4, the stress is first increased from zero to a maximum M. During this period, the differential elongation (or deformation) indicated by the recorder increases from E to G along the lower branch of curve C. Then the stress is reduced back to zero. During this return period, the differential elongation drops from G to F along the upper branch or curve C. The distance GH in the diagram indicates the non-proportional differential elongation at the maximum value M of stress. The distance EF is a measure of the remanent elongation at the end of the test. The shaded area within the loop represents the hysteresis of the material, i. e., the work consumed in the specimen for effecting the remanent deformation.

Fig. 5 shows a similar diagram. Points E', F', G' and H' of curve C' correspond as to their significance to points E, F, G and H of curve C in Fig. 4. However, the lower branch of curve C' starts its linear portion at an inclination and towards the abscissa. A hysteresis characteristic of this type is obtained if the standard piece has a different strength from that of the specimen, the angle being indicative and a measure of this difference.

The so-called offset method for determining the yield strength of a material is likewise applicable. To this end, the stress is gradually increased according to Fig. 6 from the zero point O or an initial low value to the value L in the yield range of the specimen. The recorded curve $d$ then reaches a point K. By construction, i. e., by drawing line KN in parallel to the initial linear portion of curve $d$, the distance IK or ON is obtained as a measure of the offset representative of the yield strength (see "Standard Definition of Terms Relating to Testing," A. S. T. M. Designation E 6–36, page 779, under "Offset methods"). It will be remembered, however, that the recorded values are differential and therefore of much higher accuracy than afforded by the known methods.

While I have described in detail methods for tension testing, it will be obvious to those skilled in the art that the same principles and devices can also be applied to compression, torsion and vibration tests, the only difference between these different applications being essentially in the manner of applying stress to the specimen-standard assembly.

It will also be understood from the foregoing that the particular electric strain-detecting devices, here shown as variable inductance means, may also consist of other variable impedances such as capacitive strain gauges, magnetostrictive devices, as of suitable variable voltage sources.

What I claim is:

1. The method of testing materials which comprises connecting a specimen to be tested with a standard piece, subjecting both simultaneously to the same stress below the yield point of the standard piece and below the yield point of the specimen when in sound condition, translating the strain produced by said stress in the specimen and the standard piece into two corresponding electric magnitudes, and measuring the differential value of said two magnitudes in dependence upon the stress as a measure of the quality of the specimen to be tested.

2. The method of testing materials which comprises connecting a specimen to be tested with a standard piece, subjecting both simultaneously to the same stress and increasing the stress from zero to a maximum below the yield point of the standard piece and then decreasing the stress to zero, translating the strain produced by said stress in the specimen and the standard piece into two corresponding electric magnitudes during the periods of increasing and decreasing stress, recording during both periods the differential value of said two magnitudes in dependence upon the stress so as to obtain a hysteresis loop as a measure of the quality of the specimen to be tested.

3. The method of testing a specimen of a material which comprises the steps of connecting the specimen with a standard piece of the same material and of larger dimensions and hence greater strength, subjecting both simultaneously to equal stress and increasing the stress to a value below the limit of permanent deformation of the standard piece, translating the strain produced by said stress in the specimen and the standard piece into two corresponding electric magnitudes, and measuring the differential value of said two magnitudes in dependence upon the stress as a measure of quality of the specimen.

4. A machine for testing a specimen of a material comprising means for firmly connecting said specimen with a standard piece of greater strength than said specimen under the testing conditions, means for clamping said connection at one end, means for applying variable stress to the other end of said connection, circuit means disposed at said specimen for varying an electric magnitude in accordance with the strain of said specimen, circuit means disposed at said standard piece for varying another electric magnitude in accordance with the strain in said standard piece, a balanceable electric measuring network connected to both said circuit means and having a differential branch responsive to the differential effect of said two electric magnitudes, and means connected with said differential branch and said stress applying means for indicating said differential effect in dependence upon the magnitude of the stress.

5. A machine for testing a specimen of a material comprising means for firmly connecting said specimen with a standard piece of greater strength than said specimen under the testing conditions, means for clamping said connection at one end, means for applying variable stress to the other end of said connection, circuit means disposed at said specimen for varying an electric magnitude in accordance with the strain of said specimen, circuit means disposed at said standard piece for varying another electric magnitude in accordance with the strain in said standard piece, a balanceable electric measuring network connected to both said circuit means and having a zero branch, a variable circuit device disposed in said network for balancing the effect of said two circuit means on said zero branch, and balance responsive indicating means connected between said zero branch and said stress applying means for indicating the differential effect of said two electric magnitudes as a function of the stress produced by said stress-applying means.

6. A machine for testing a specimen of a material comprising means for firmly connecting said specimen with a standard piece of greater strength than said specimen under the testing conditions, means for clamping said connection at one end, means for applying variable stress to the other end of said connection, circuit means disposed at said specimen for varying an electric magnitude in accordance with the strain of said specimen, circuit means disposed at said standard piece for varying another electric magnitude in accordance with the strain in said standard piece, a balanceable electric measuring network connected to both said circuit means and having a zero branch, a variable circuit device disposed in said network for balancing the effect of said two circuit means on said zero branch, a balance-responsive relay arranged in said zero branch so as to be actuated when the adjustment of said device corresponds to the differential effect of said two electric magnitudes on said zero branch, a recording instrument having two relatively movable recorder members, cyclically operating drive means for varying the adjustment of said device and of one of said recorder members in synchronism with each other, means for actuating said stress applying means and said other recorder members in a fixed relation to each other, and a pilot circuit connecting said relay with said recording instrument for causing the latter to effect a recording mark at the moment of balance, whereby the record produced over a number of cycles of said drive means represents the differential strain value of said specimen and said standard piece in dependency upon the stress applied thereto.

7. A machine for determining stress-strain characteristics of a specimen of a material to be tested, comprising in combination a standard piece of sufficient strength to be stressed below its yield limit when performing the test, a connecting member for firmly connecting said specimen and said standard piece so as to have them arranged coaxially and in alignment with each other, means for anchoring one end of said arrangement, means for holding the other end of said arrangement and for applying variable stress thereto in order to have the same stress act on said specimen and on said standard piece simultaneously, a variable electric impedance device disposed at said specimen for varying its effective impedance value in accordance with the deformation of said specimen when stressed, another variable electric impedance device disposed at said standard piece for varying its effective impedance value in accordance with the deformation of said standard piece when stressed, a balanceable measuring network connected with said two devices and having a zero branch and a variable circuit member for balancing the differential effect of said device on said zero branch, a balance-responsive relay arranged in said zero branch, a recording instrument having two relatively movable recorder members, cyclically operating drive means for varying the adjustment of said device and of one of said recorder members in synchronism with each other, means for actuating said stress applying means and said other recorder members in a fixed relation to each other, and a pilot circuit connecting said relay with said recording instrument for causing the latter to effect a recording mark at the moment of balance, whereby the record produced over a number of cycles of said drive means represents the differential deformation of said specimen and said standard piece in dependence upon the stress applied thereto.

8. A machine for determining stress-strain characteristics of a specimen of a material to be tested, comprising in combination a standard piece of sufficient strength to be stressed below its yield limit when performing the test, a connecting member for firmly connecting said specimen and said standard piece so as to have them arranged coaxially and in alignment with each other, means for anchoring one end of said arrangement, means for holding the other end of said arrangement, means for applying variable force to said holding means in order to stress said specimen and said standard piece in the axial direction of said arrangement, circuit means disposed at said specimen for varying an electric magnitude in accordance with the strain of said specimen, circuit means disposed at said standard piece for varying another electric magnitude in accordance with the strain in said standard piece, a balanceable electric measuring network connected to both said circuit means and having a differential branch responsive to the differential effect of said two electric magnitudes, and means connected with said differential branch and said stress applying means for indicating said differential effect in dependence upon the magnitude of the stress.

9. A machine for testing solid materials by comparing a specimen with a standard, comprising stress applying means for simultaneously subjecting said specimen and said standard to variable stress in a given proportion to each other, two devices for separately translating the strain of said specimen and said standard into corresponding variations of two electric quantities respectively, circuit means connected with said devices for forming an electric differential effect of said two quantities, and measuring means connected with said circuit means and said stress applying means for indicating said differential effect in dependence upon the variation of said stress as a measure of the quality of said specimen.

10. A machine for testing materials by comparing a specimen piece with a standard piece, comprising stress applying means for simultaneously subjecting said two pieces to variable stress in a given proportion to each other, two electric strain gauges each having two relatively movable members engaging one of said pieces, respectively, at spaced points for translating the stress-responsive deformation of said piece into a corresponding electric variation, and electric measuring means connected with said two guages for forming and indicating the differential electric effect of said two variations in dependence upon the variation of said stress as a measure of the quality of said specimen.

GEORGE KEINATH.